(12) United States Patent
Wantuch et al.

(10) Patent No.: US 11,978,213 B2
(45) Date of Patent: *May 7, 2024

(54) BOUNDARY DETECTION EVALUATION

(71) Applicant: National Technology & Engineering Solutions of Sandia, LLC, Albuquerque, NM (US)

(72) Inventors: Andrew C. Wantuch, Albuquerque, NM (US); Kyle Saxberg, Mountain View, CA (US); Edward Steven Jimenez, Jr., Albuquerque, NM (US); Jaxon Gittinger, Albuquerque, NM (US); Srivathsan Koundinyan, Bordentown, NJ (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/323,214

(22) Filed: May 18, 2021

(65) Prior Publication Data

US 2021/0279885 A1    Sep. 9, 2021

Related U.S. Application Data

(62) Division of application No. 16/424,264, filed on May 28, 2019, now Pat. No. 11,042,988.

(Continued)

(51) Int. Cl.
*G06T 7/13*    (2017.01)
*G06T 7/162*    (2017.01)
*G06T 7/168*    (2017.01)

(52) U.S. Cl.
CPC .............. *G06T 7/13* (2017.01); *G06T 7/162* (2017.01); *G06T 7/168* (2017.01); *G06T 2207/10012* (2013.01); *G06T 2207/20072* (2013.01)

(58) Field of Classification Search
CPC .......... G06T 7/13; G06T 7/162; G06T 7/168; G06T 2207/10012; G06T 2207/20072
See application file for complete search history.

(56) References Cited

U.S. PATENT DOCUMENTS 6,775,399 B1 * 8/2004 Jiang ...................... G06T 7/155
382/128
7,980,473 B2    7/2011 Zhang et al.
(Continued)

*Primary Examiner* — Qun Shen
(74) *Attorney, Agent, or Firm* — Gregory M. Doudnikoff; Yee & Associates, P.C.

(57) ABSTRACT

Illustrative embodiments are directed to a method and apparatus for evaluating boundary detection in an image. A processed image is received, wherein a detected boundary of an image of an object is identified in the processed image. A Radon transform is applied to the processed image for a plurality of angles to form a processed image histogram corresponding to the detected boundary for each of the plurality of angles. The processed image histogram for each of the plurality of angles and a corresponding ground truth histogram for each of the plurality of angles is normalized to provide a normalized processed image histogram and a normalized ground truth histogram for each of the plurality of angles, wherein the ground truth histogram corresponds to a ground truth boundary of the object for a corresponding angle. An indication of the edges of the normalized processed image histogram for each of the plurality of angles is plotted to form a boundary detection evaluation visualization.

22 Claims, 8 Drawing Sheets

Related U.S. Application Data

(60) Provisional application No. 62/691,496, filed on Jun. 28, 2018.

(56) References Cited

U.S. PATENT DOCUMENTS

| | | | |
|---|---|---|---|
| 10,346,728 B2 * | 7/2019 | Fu | G06V 30/19173 |
| 10,517,543 B2 | 12/2019 | Pan et al. | |
| 2008/0101681 A1 * | 5/2008 | Schmiegel | G01V 5/0008 |
| | | | 382/141 |
| 2009/0005693 A1 * | 1/2009 | Brauner | G06T 7/0012 |
| | | | 600/481 |
| 2014/0093164 A1 * | 4/2014 | Noorkami | G06V 20/46 |
| | | | 382/165 |
| 2016/0335774 A1 * | 11/2016 | Hsieh | G06T 7/536 |

* cited by examiner

BOUNDARY DETECTION EVALUATION

RELATED APPLICATIONS

This application is a divisional of and claims the benefit of U.S. Ser. No. 16/424,264, filed May 28, 2019, which claims the benefit of U.S. Provisional Patent Application No. 62/691,496, filed Jun. 28, 2018, both of which are incorporated by reference herein in their entirety.

GOVERNMENT LICENSE RIGHTS

This invention was made with Government support under Contract No. DE-NA0003525 awarded by the United States Department of Energy/National Nuclear Security Administration. The United States Government has certain rights in this invention.

BACKGROUND INFORMATION

1. Field

The present disclosure relates generally to image processing and to systems and methods for processing images to identify the boundary of objects of interest in the images. More particularly, illustrative embodiments are directed to a system and method for evaluating boundary detection in image processing.

2. Background

Various imaging systems may be used to obtain images of scenes that include objects of interest. Such images may be processed to identify the objects of interest in the images. For example, without limitation, boundary detection algorithms may be used to identify the boundaries of objects of interest appearing in images. Alternatively, or in addition, a human may view an image to identify the boundaries of objects of interest appearing in the image.

The ability of a particular boundary detection algorithm, or human viewer, to determine accurately the boundary of an object of interest appearing in an image may depend on various factors or combinations of factors. For example, without limitation, factors such as the imaging system used to obtain the images, the nature of the scene or of the object of interest in the scene being imaged, the conditions under which the image was obtained, and other factors or various combinations of factors may affect the ability of a boundary detection algorithm or human viewer to determine accurately the boundary of an object of interest appearing in an image.

It may be desirable to know how well a particular boundary detection algorithm or human viewer is performing at determining accurately the boundary of an object of interest appearing in an image. In particular, it may be desirable to be able to evaluate the accuracy of boundary detection by various methods and across images obtained under various conditions in an effective and efficient manner.

Therefore, it would be desirable to have a method and apparatus that takes into account at least some of the issues discussed above, as well as other possible issues.

SUMMARY

The illustrative embodiments provide method of evaluating boundary detection in an image. A processed image is received, wherein a detected boundary of an image of an object is identified in the processed image. A Radon transform is applied to the processed image for a plurality of angles to form a processed image histogram corresponding to the detected boundary for each of the plurality of angles. The processed image histogram for each of the plurality of angles and a corresponding ground truth histogram for each of the plurality of angles is normalized to provide a normalized processed image histogram and a normalized ground truth histogram for each of the plurality of angles, wherein the ground truth histogram corresponds to a ground truth boundary of the object for a corresponding angle. An indication of the edges of the normalized processed image histogram for each of the plurality of angles is plotted to form a boundary detection evaluation visualization.

The illustrative embodiments also provide an apparatus comprising a receiver, a Radon transformer, a normalizer, and a visualization generator. The receiver is configured to receive a processed image, wherein a detected boundary of an image of an object is identified in the processed image. The Radon transformer is configured to apply a Radon transform to the processed image for a plurality of angles to form a processed image histogram corresponding to the detected boundary for each of the plurality of angles. The normalizer is configure to normalize the processed image histogram for each of the plurality of angles and a corresponding ground truth histogram for each of the plurality of angles to provide a normalized processed image histogram and a normalized ground truth histogram for each of the plurality of angles, wherein the ground truth histogram corresponds to a ground truth boundary of the object for a corresponding angle. The visualization generator is configured to plot an indication of the edges of the normalized processed image histogram for each of the plurality of angles to form a boundary detection evaluation visualization.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments described herein recognize and take into account different considerations. For example, the illustrative embodiments recognize and take into account that it is desirable to be able to evaluate boundary detection of objects in images in an effective and efficient manner.

Illustrative embodiments provide a system and method for evaluating boundary detection in which a readily understandable visualization of boundary detection effectiveness is presented. The improved visualization of boundary detection effectiveness in accordance with an illustrative embodiment can aid in understanding the conditions under which a boundary detection algorithm is effective and the conditions under which a boundary detection algorithm is not effective. The improved visualization of boundary detection effectiveness in accordance with an illustrative embodiment also may be used to aid in tuning a boundary detection algorithm to improve effectiveness of the algorithm under various conditions.

Figure 1:
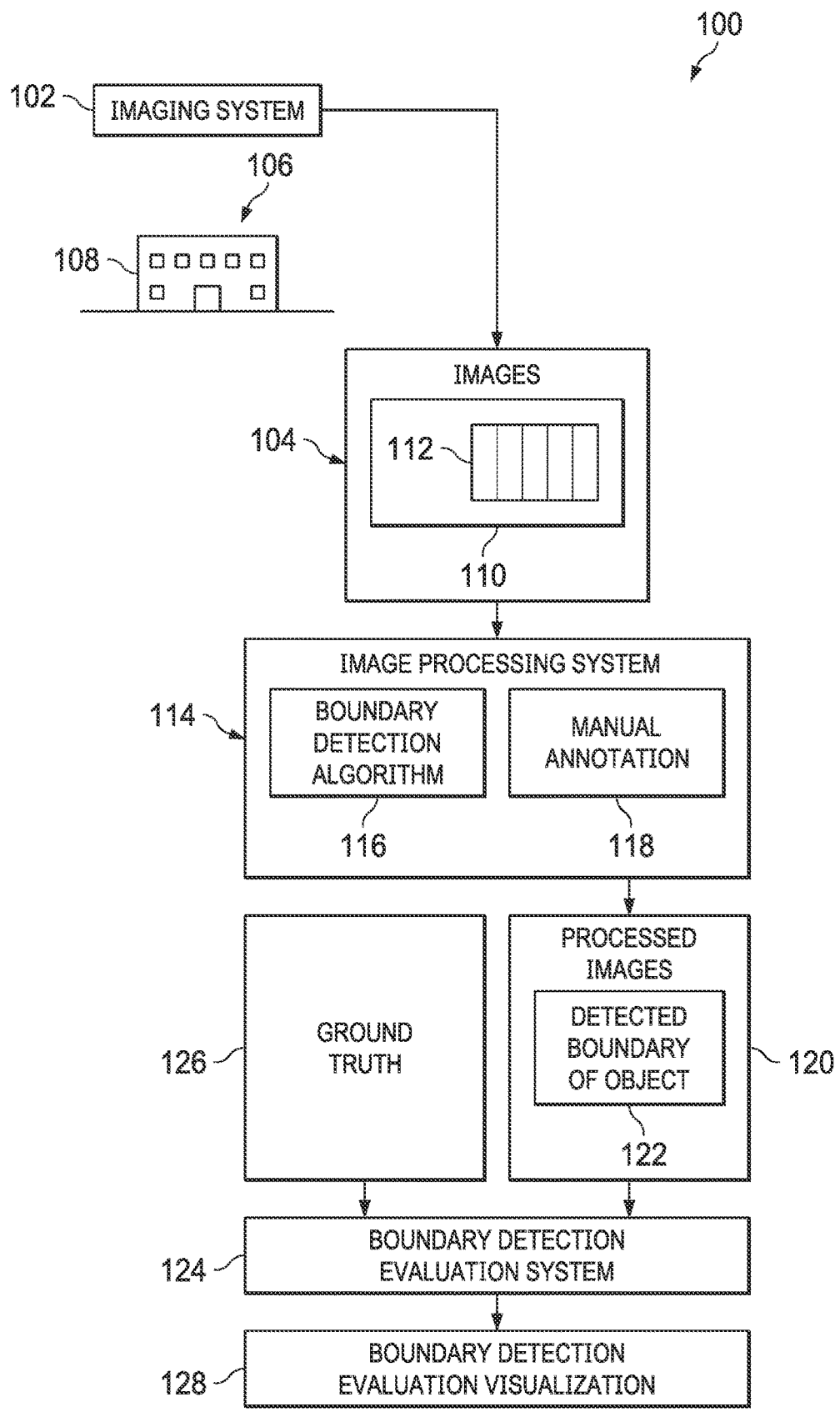
FIG. 1 is an illustration of a block diagram of an image processing environment in accordance with an illustrative embodiment.

Turning to FIG. 1, an illustration of a block diagram of an image processing environment is depicted in accordance with an illustrative embodiment. Image processing environment 100 may include imaging system 102. Imaging system 102 may include a camera or any other appropriate device or system for obtaining images 104 of scene 106. Scene 106 may include any appropriate area or volume that includes object 108 of interest. Object 108 may be, for example, without limitation, a building, a vehicle, a person, or any other appropriate structure or other object. Image 110 in images 104 of scene 106 thus may include object image 112 of object 108 in scene 106.

Images 104 from imaging system 102 may be processed by image processing system 114. For example, without limitation, image processing system 114 may be configured to identify the boundary of object image 112 in image 110 using boundary detection algorithm 116. Alternatively, or in addition, image processing system 114 may allow a human viewer of image 110 to identify object image 112 in image 110 by manual annotation 118. In any case, image processing system 114 may produce processed images 120 in which detected boundary of object 122, as determined by boundary detection algorithm 116 or manual annotation 118, is identified.

In accordance with an illustrative embodiment, boundary detection evaluation system 124 is configured to evaluate how well detected boundary of object 122 as determined by boundary detection algorithm 116 or manual annotation 118 matches ground truth 126. Ground truth 126 is the actual boundary of object 108 in scene 106. Specifically, boundary detection evaluation system 124 is configured to generate boundary detection evaluation visualization 128 from which the relationship between detected boundary of object 122 and ground truth 126 is readily determined.

Figure 2:
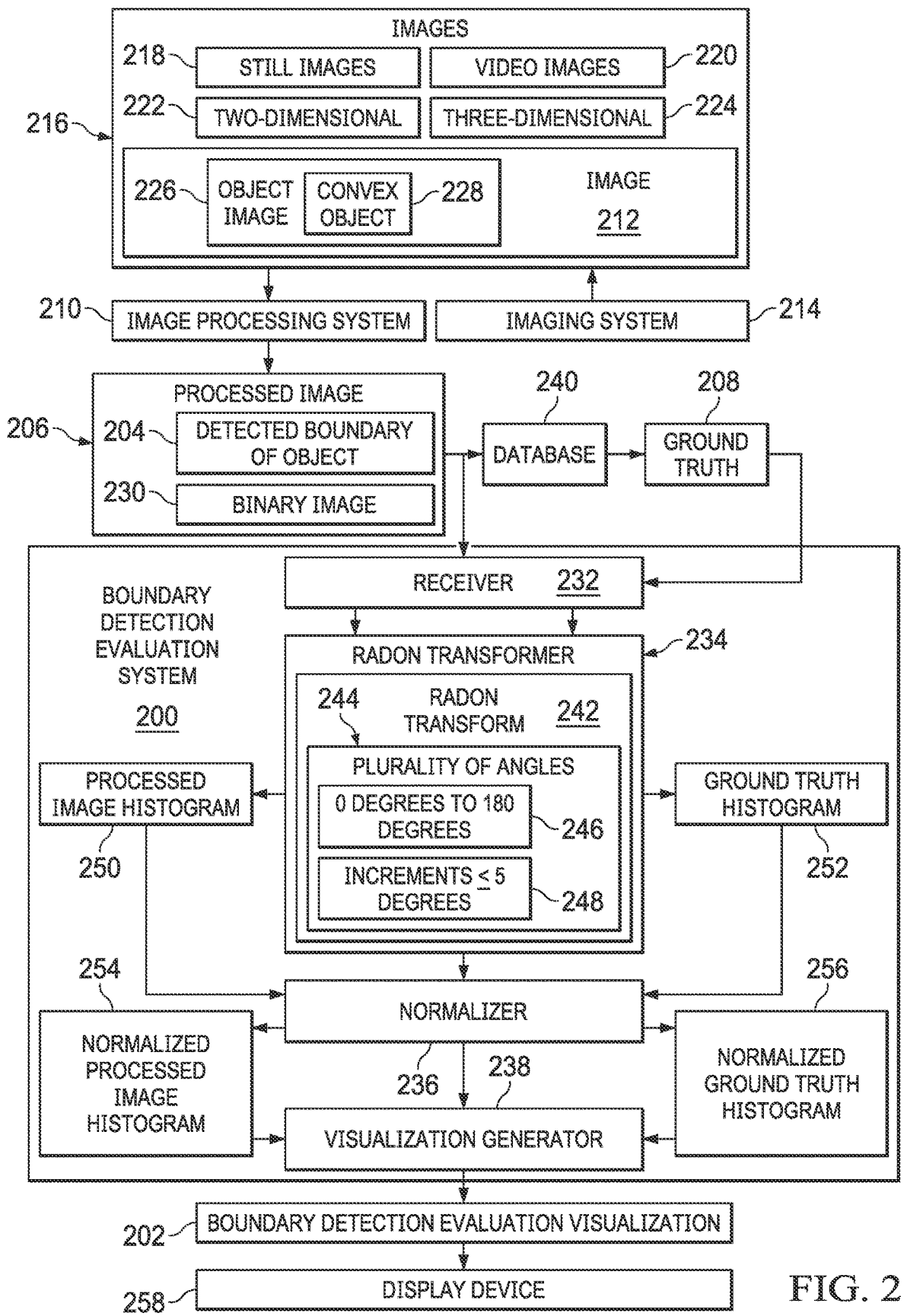
FIG. 2 is an illustration of a block diagram of a boundary detection evaluation system in accordance with an illustrative embodiment.

Turning to FIG. 2, an illustration of a block diagram of a boundary detection evaluation system is depicted in accordance with an illustrative embodiment. Boundary detection evaluation system 200 may be an example of one implementation of boundary detection evaluation system 124 in FIG. 1.

Boundary detection evaluation system 200 is configured to generate boundary detection evaluation visualization 202 which indicates how well detected boundary of object 204 in processed image 206 matches the actual boundary of the object in ground truth 208. Processed image 206 may be generated by image processing system 210 from image 212 provided by imaging system 214. Imaging system 214 may be an implementation of imaging system 102 in FIG. 1. Image processing system 210 may be an implementation of image processing system 114 in FIG. 1.

Image 212 may be one of a plurality of images 216 provided by imaging system 214. For example, without limitation, images 216 may be still images 218 or video images 220. Illustrative embodiments may use images 216 of any appropriate n-dimensions. For example, without limitation, images 216 may be two-dimensional 222 or three-dimensional 224.

Image 212 in images 216 may include object image 226. Object image 226 may be the image of an object of interest appearing in image 212. For example, without limitation, object image 226 may be an image of convex object 228.

Image processing system 210 may process image 212 using a boundary detection algorithm or manual annotation to identify detected boundary of object 204 in processed image 206. For example, without limitation, processed image 206 may be binary image 230 in which the picture elements, pixels, forming processed image may be only one of two colors. In this case, detected boundary of object 204 may be indicated by pixels of one color in binary image 230.

Boundary detection evaluation system 200 may include receiver 232, Radon transformer 234, normalizer 236, and visualization generator 238. For example, without limitation, processed image 206 may be stored in database 240. In this case, receiver 232 may be configured to retrieve processed image 206 from database for use by boundary detection evaluation system 200. Alternatively, or in addition, receiver 232 may be configured to receive processed image 206 directly from image processing system 210.

Radon transformer 234 is configured to apply Radon transform 242 to processed image 206 for plurality of angles 244. For example, without limitation, radon transformer 234 may be configured to apply Radon transform 242 to processed image 206 for plurality of angles 244 from 0 degrees to 180 degrees 246 in increments of less than or equal to 5 degrees 248. Alternatively, any other appropriate range of plurality of angles 244 and increment between angles in plurality of angles 244 may be used.

The output of Radon transformer 234 is processed image histogram 250 for each angle in plurality of angles 244. The value of processed image histogram 250 for any one of plurality of angles 244 at any point is the integral across detected boundary of object 204 in processed image 206 along a line at the angle.

Normalizer 236 is configured to normalize processed image histogram 250 for each of plurality of angles 244 and a corresponding ground truth histogram 252 for each of plurality of angles 244. For example, without limitation, ground truth histogram 252 for each of plurality of angles 244 may be generated by Radon transformer 234 applying Radon transform 242 for plurality of angles 244 to ground truth 208 identifying the actual boundary of the object corresponding to detected boundary of object 204. The output of normalizer 236 is normalized processed image histogram 254 and normalized ground truth histogram 256.

Normalizer 236 may be configured to normalize processed image histogram 250 and ground truth histogram 252 such that edges of normalized ground truth histogram 256 for each of plurality of angles 244 is the same distance from an origin. For example, without limitation, normalizer 236 may be configured to normalize processed image histogram 250 and ground truth histogram 252 such that one edge of normalized ground truth histogram 256 for each of plurality of angles 244 is at −1 and the other edge of normalized ground truth histogram 256 for each of plurality of angles 244 is at 1.

Visualization generator 238 may be configured to generate boundary detection evaluation visualization 202 by plotting an indication of the edges of normalized processed image histogram 254 for each of plurality of angles 244. Visualization generator 238 may display a circle centered at the origin and having a radius of the distance used for normalization to indicate the ground truth boundary of the object. The positions of the plotted indications of the edges of normalized processed image histogram 254 with respect to this circle indicate how well the detected boundary of the object correspond to the actual boundary.

Boundary detection evaluation visualization 202 may be displayed for use by a user on any appropriate display device 258.

The illustration of boundary detection evaluation system 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
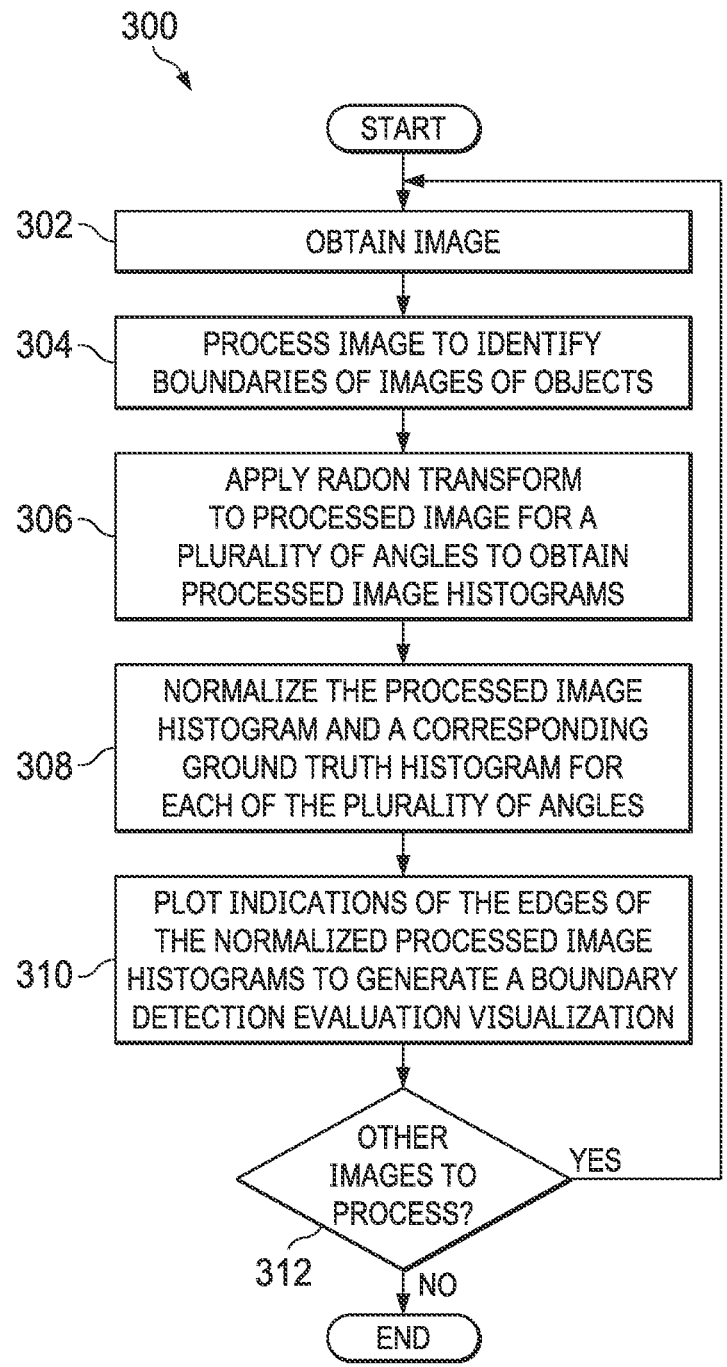
FIG. 3 is illustration of a flowchart of a process for boundary detection evaluation in accordance with an illustrative embodiment.

Turning to FIG. 3, an illustration of a flowchart of a process for boundary detection evaluation is depicted in accordance with an illustrative embodiment. Process 300 is an example of a process for boundary evaluation that may be implemented in boundary detection evaluation system 200 in FIG. 2.

Process 300 may begin with obtaining an image (operation 302). For example, operation 302 may include obtaining an image using any appropriate imaging system. The obtained image may then be processed to identify boundaries of objects of interest in the image (operation 304). For example, the boundaries of objects may be identified using a boundary detection algorithm or by manual annotation by a human operator.

A Radon transform may then be applied to the processed image for a plurality of angles to obtain a processed image histogram for each of the plurality of angles (operation 306). The processed image histogram and a corresponding ground truth histogram for each of the plurality of angles may then be normalized (operation 308). Indications of edges of the normalized processed image histograms for the plurality of angles may then be plotted to generate a boundary detection evaluation visualization (operation 310).

It may be determined whether there are other images to be processed (operation 312). In response to a determination at operation 312 that there are other images to be processed, process 300 may return to operation 302 to obtain another image to be processed. In response to a determination at operation 312 that there are no other images to be processed, process 300 may terminate.

Figure 4:
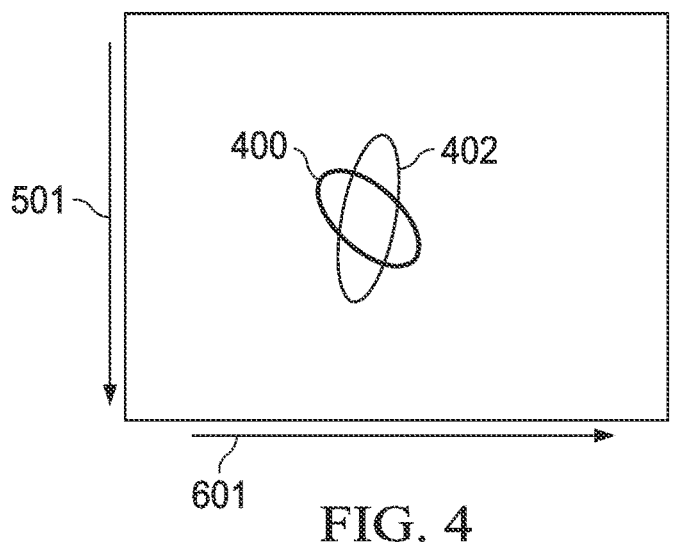
FIG. 4 is an illustration of a detected boundary of an object and a ground truth boundary of an object in accordance with an illustrative embodiment.

Turning to FIG. 4, an illustration of a detected boundary of an object and a ground truth boundary of an object is depicted in accordance with an illustrative embodiment. Ground truth boundary 400 and detected boundary 402 are shown overlaid.

Figure 5:
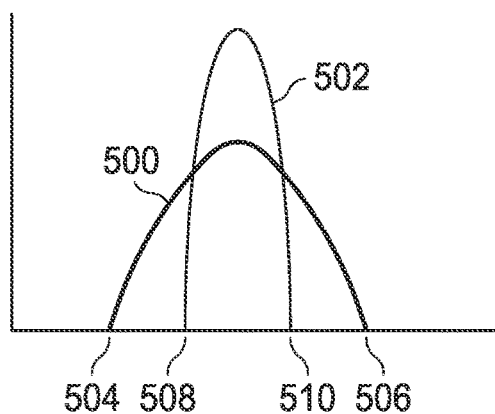
FIG. 5 is an illustration of histograms resulting from applying a Radon transform to the detected boundary and the ground truth boundary in FIG. 4 at a first angle in accordance with an illustrative embodiment.

Turning to FIG. 5, an illustration of histograms resulting from applying a Radon transform to the detected boundary and the ground truth boundary in FIG. 4 at a first angle is depicted in accordance with an illustrative embodiment. Ground truth boundary histogram 500 is generated by applying the Radon transform in the vertical direction, in the direction of arrow 501 in FIG. 4, to ground truth boundary 400. Detected boundary histogram 502 is generated by applying the Radon transform in the vertical direction, in the direction of arrow 501 in FIG. 4, to detected boundary 402. The edges of ground truth boundary histogram 500 are at points 504 and 506. The edges of detected boundary histogram 502 are at points 508 and 510.

Figure 6:
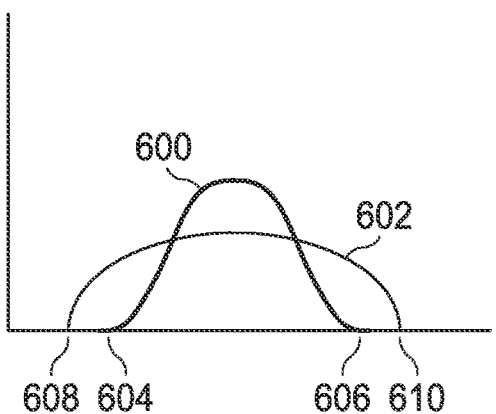
FIG. 6 is an illustration of histograms resulting from applying a Radon transform to the detected boundary and the ground truth boundary in FIG. 4 at a second angle in accordance with an illustrative embodiment.

Turning to FIG. 6, an illustration of histograms resulting from applying a Radon transform to the detected boundary and the ground truth boundary in FIG. 4 at a second angle is depicted in accordance with an illustrative embodiment. Ground truth boundary histogram 600 is generated by applying the Radon transform in the horizontal direction, in the direction of arrow 601 in FIG. 4, to ground truth boundary 400. Detected boundary histogram 602 is generated by applying the Radon transform in the horizontal, in the direction of arrow 601 in FIG. 4, to detected boundary 402. The edges of ground truth boundary histogram 600 are at points 604 and 606. The edges of detected boundary histogram 602 are at points 608 and 610.

Figure 7:
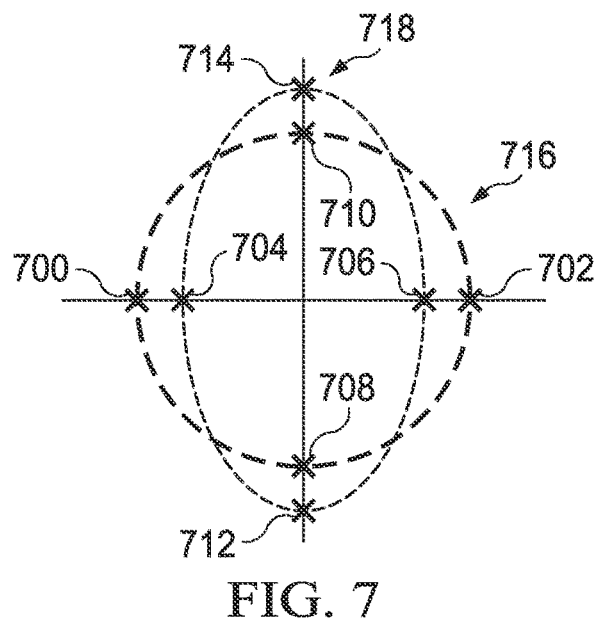
FIG. 7 is an illustration of a plot of the edges of the histograms in FIG. 5 and FIG. 6 after being normalized in accordance with the illustrative embodiment.

Turning to FIG. 7, an illustration of a plot of the edges of the histograms in FIG. 5 and FIG. 6 after being normalized is depicted in accordance with the illustrative embodiment. Points 700, 702, 704, and 706 correspond to points 504, 506, 508, and 510, respectively, in FIG. 5. Points 708, 710, 712, and 714 correspond to points 604, 606, 608, and 610, respectively, in FIG. 6. Circle 716 through points 700, 702, 710, and 712 corresponds to the actual ground truth boundary 400 in FIG. 4. Points 704, 706, 712, and 714 correspond to detected boundary 402 in FIG. 4.

Figure 8:
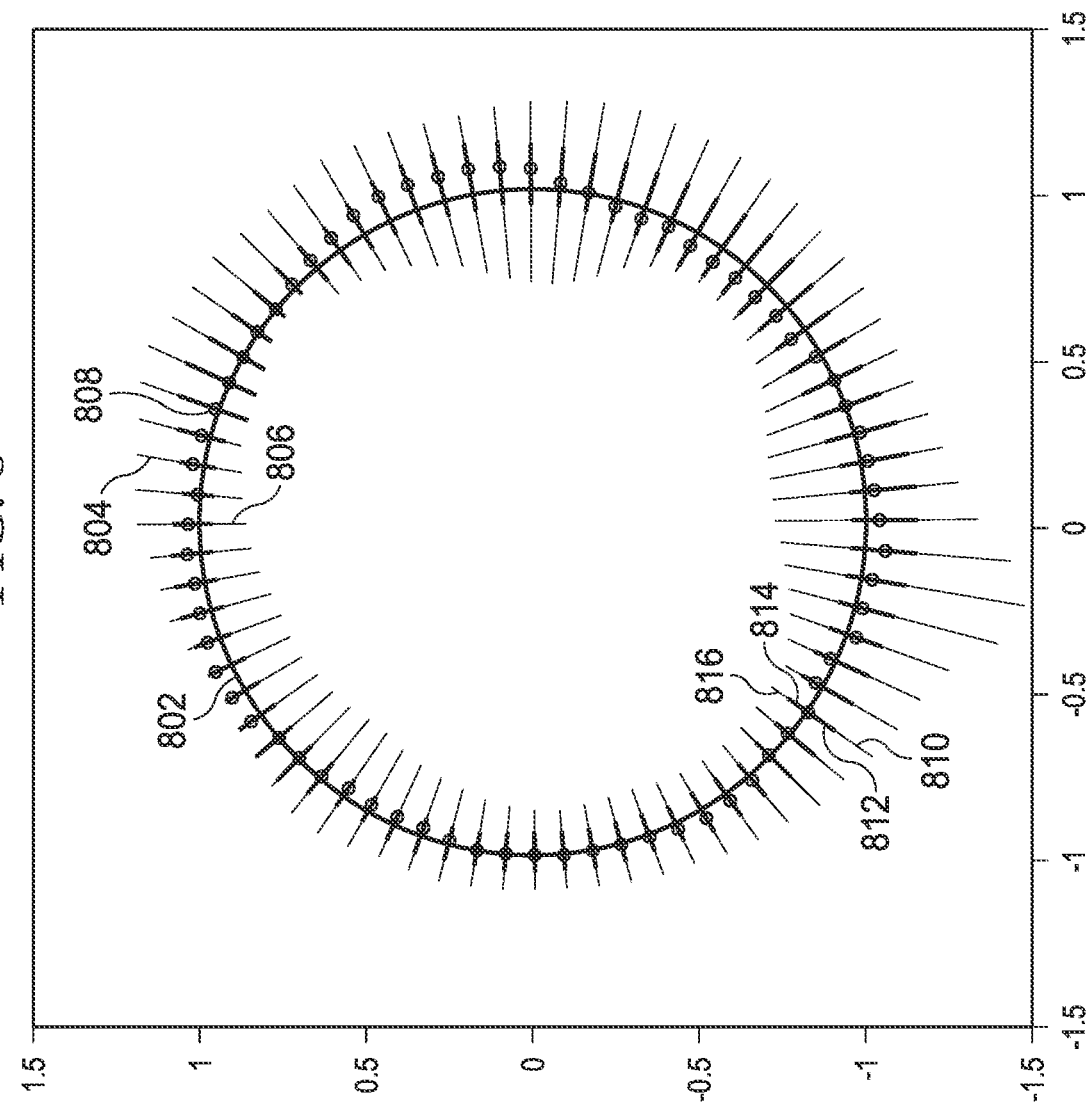
FIGS. 8-10 are illustrations of examples of boundary detection evaluation visualizations in accordance with an illustrative embodiment.
Figure 9:
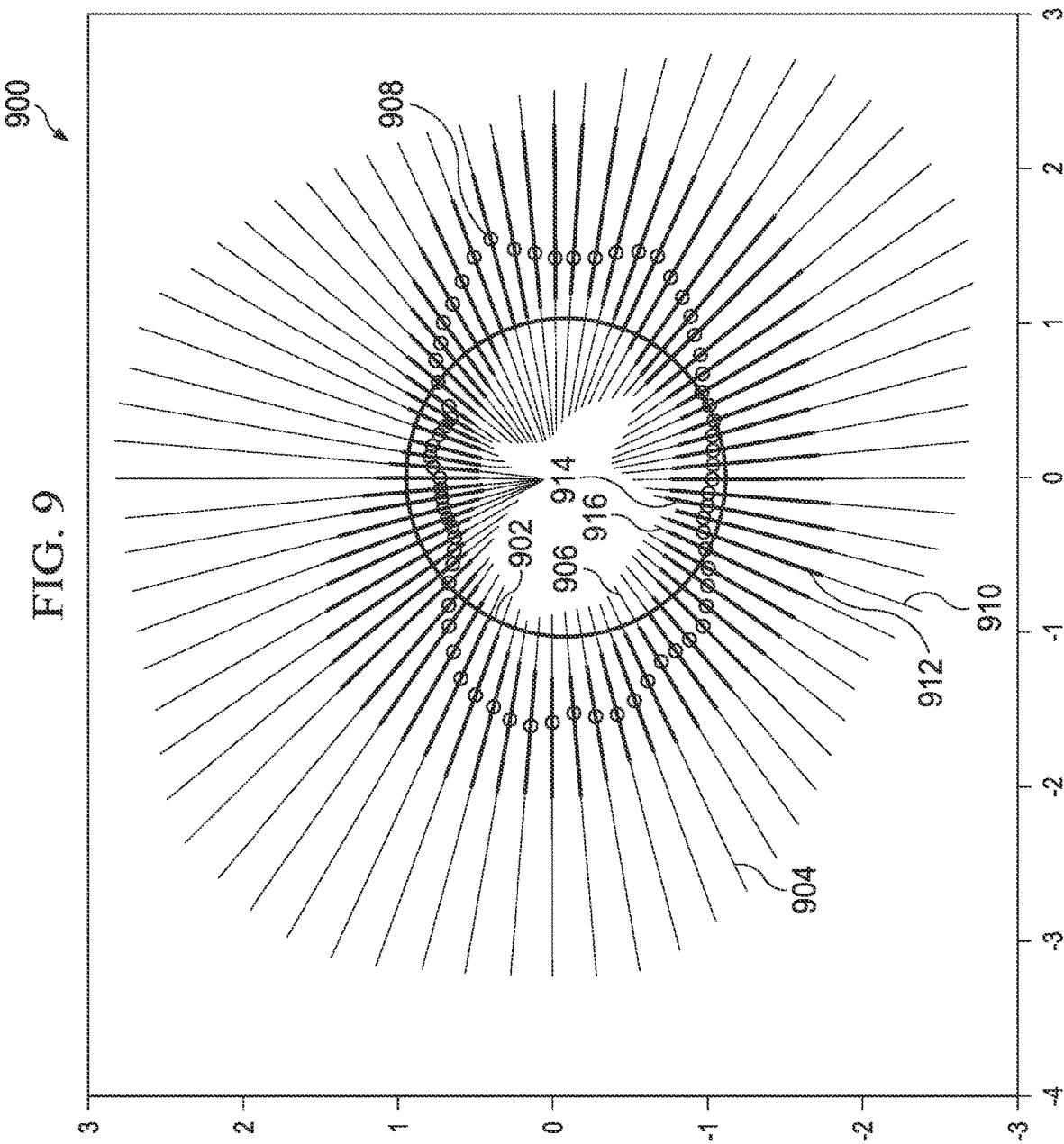
Figure 10:
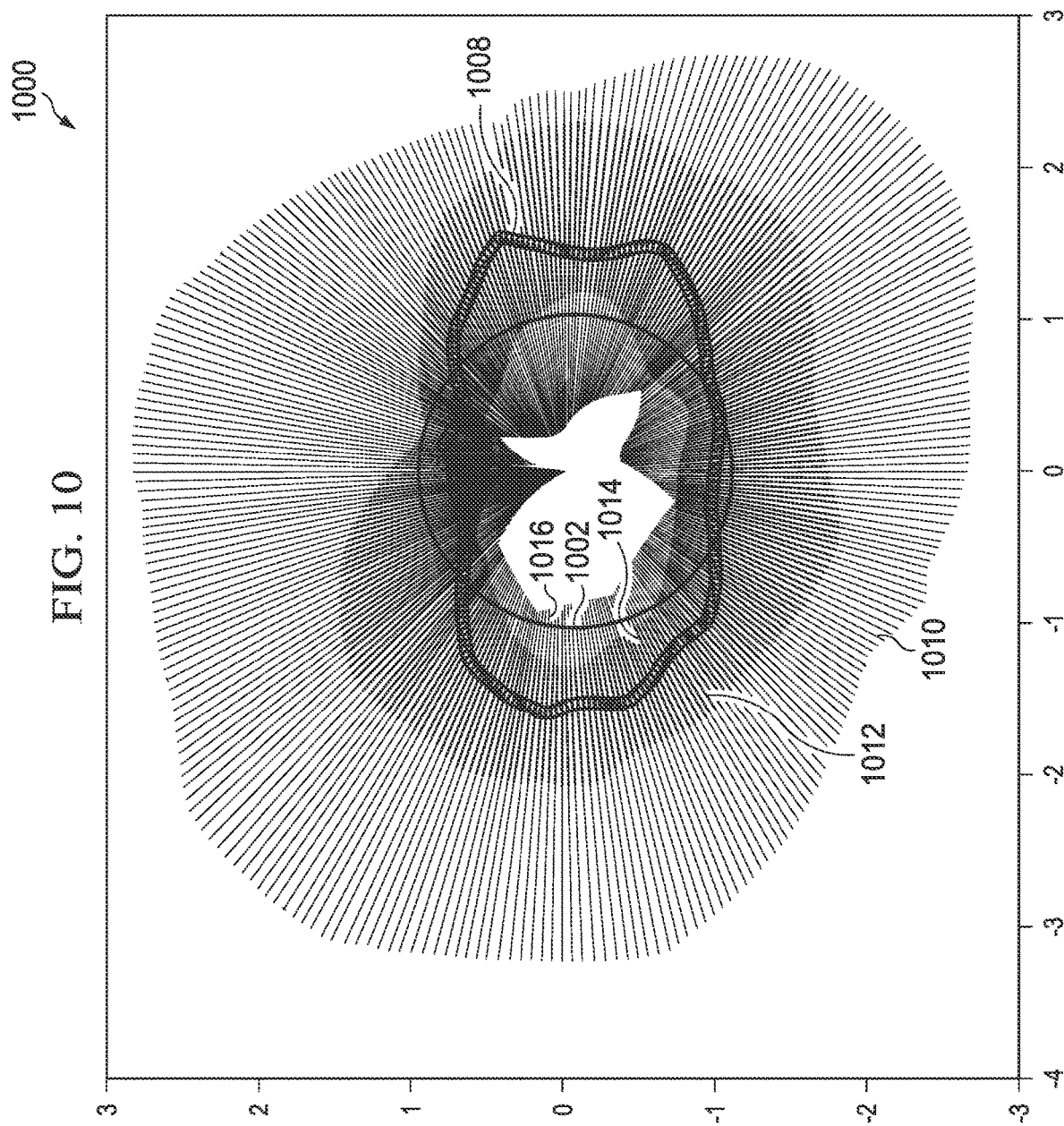

Turning to FIGS. 8-10, illustrations of examples of boundary detection evaluation visualizations are depicted in accordance with an illustrative embodiment.

Boundary detection evaluation visualization 800 in FIG. 8 shows the evaluation of a relatively well performing boundary detection algorithm on 9 images. In boundary detection evaluation visualization 800, circle 802 represents the ground truth boundary of an object of interest. Plotted points indicating the edges of the normalized processed image histogram for each angle for the plurality of images considered are represented by line segments in boundary detection evaluation visualization 800. For example, the plotted points indicating the edges of the normalized processed image histograms for the plurality of images for one angle is indicated by a line segment extending from point 804 to point 806, wherein points 804 and 806 are the furthest apart of the points indicating an edge of each of the normalized processed image histograms for the plurality of images at that angle. The plotted position of the median point between points 804 and 806 may be indicated by circle 808 or another indicator along the line segment.

The distribution of plotted points along a line segment may be indicted by boxplot. For example, a line segment may be divided into segments 810, 812, 814, and 816, wherein a quartile of the plotted points is in each of segments 810, 812, 814, and 816. For example, segments 810, 812, 814, and 816 may be distinguished by different colors, shades of color, line thickness, or in any other appropriate manner.

Boundary detection evaluation visualization 900 in FIG. 9 shows the evaluation of a relatively poor performing boundary detection algorithm. In boundary detection evaluation visualization 900, circle 902 represents the ground truth boundary of an object of interest. Plotted points indicating the edges of the normalized processed image histogram for each angle for the plurality of images considered are represented by line segments in boundary detection evaluation visualization 900. For example, the plotted points indicating the edges of the normalized processed image histograms for the plurality of images for one angle is indicated by a line segment extending from point 904 to point 906, wherein points 904 and 906 are the furthest apart of the points indicating an edge of each of the normalized processed image histograms for the plurality of images at that angle. The plotted position of the median point between points 904 and 906 may be indicated by circle 908 or another indicator along the line segment.

The distribution of plotted points along a line segment may be indicted by boxplot. For example, a line segment may be divided into segments 910, 912, 914, and 916, wherein a quartile of the plotted points are in each of segments 910, 912, 914, and 916. For example, segments 910, 912, 914, and 916 may be distinguished by different colors, shades of color, line thickness, or in any other appropriate manner.

Boundary detection evaluation visualization 1000 in FIG. 10 shows the evaluation of a relatively poor performing boundary detection algorithm in which the number of angles used is increased to improve resolution. In boundary detection evaluation visualization 1000, circle 1002 represents the ground truth boundary of an object of interest. Plotted points indicating the edges of the normalized processed image histogram for each angle for the plurality of images considered are represented by line segments in boundary detection evaluation visualization 1000. Due to the higher resolution in boundary detection evaluation visualization, the line segments present the appearance of areas. In this example, the plotted positions of the median points appear as continuous shape 1008 or another indicator along the line segment. The distribution of plotted points in this case is represented by areas 1010, 1012, 1014, and 1016. For example, areas 1010, 1012, 1014, and 1016 may be distinguished by different colors, shades of color, line thickness, or in any other appropriate manner.

Figure 11:
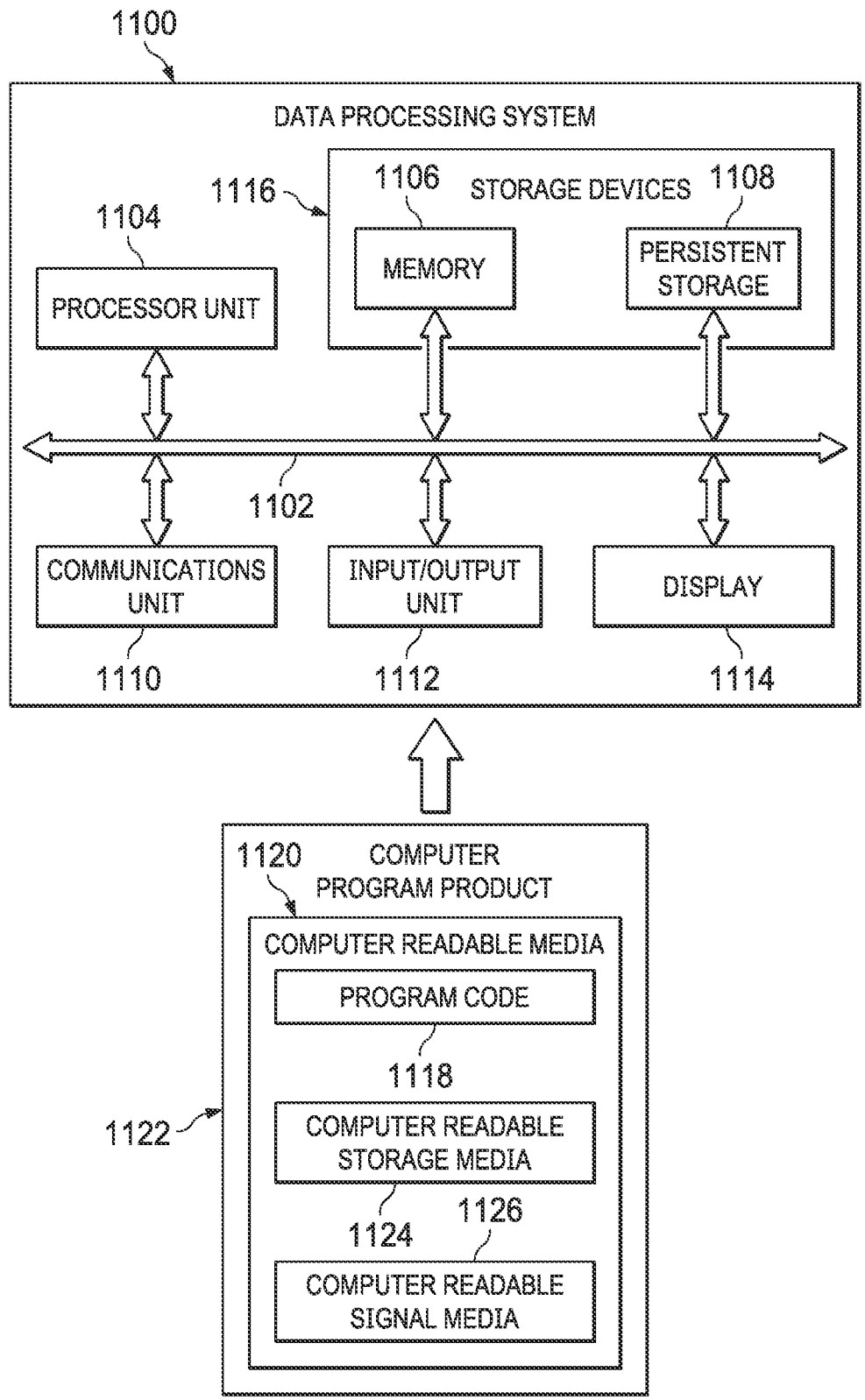
FIG. 11 is an illustration of a block diagram of a data processing system in accordance with an illustrative embodiment.

Turning to FIG. 11, an illustration of a block diagram of a data processing system is depicted in accordance with an illustrative embodiment. Data processing system 1100 is an example of one possible implementation of a data processing system for performing functions of a boundary detection evaluation system in accordance with an illustrative embodiment. For example, without limitation, data processing system 1100 is an example of one possible implementation of a data processing system for implementing boundary detection evaluation system 200 in FIG. 2.

In this illustrative example, data processing system 1100 includes communications fabric 1102. Communications fabric 1102 provides communications between processor unit 1104, memory 1106, persistent storage 1108, communications unit 1110, input/output (I/O) unit 1112, and display 1114. Memory 1106, persistent storage 1108, communications unit 1110, input/output (I/O) unit 1112, and display 1114 are examples of resources accessible by processor unit 1104 via communications fabric 1102.

Processor unit 1104 serves to run instructions for software that may be loaded into memory 1106. Processor unit 1104 may be a number of processors, a multi-processor core, or some other type of processor, depending on the particular implementation. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and other suitable information either on a temporary basis or a permanent basis. Storage devices 1116 also may be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output (I/O) unit 1112 allows for input and output of data with other devices that may be connected to data processing system 1100. For example, input/output (I/O) unit 1112 may provide a connection for user input through a keyboard, a mouse, and/or some other suitable input device. Further, input/output (I/O) unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program instructions, program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126.

Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code. As one example, data processing system 1100 may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, communications unit 1110 may include a number of devices that transmit data, receive data, or both transmit and receive data. Communications unit 1110 may be, for example, a modem or a network adapter, two network adapters, or some combination thereof. Further, a memory may be, for example, memory 1106, or a cache, such as that found in an interface and memory controller hub that may be present in communications fabric 1102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of evaluating boundary detection in an image, comprising:
   receiving a processed image, wherein a detected boundary of an object image of an object is identified in the processed image;
   applying a Radon transform to the processed image for a plurality of angles to form a processed image histogram corresponding to the detected boundary for each of the plurality of angles;
   normalizing the processed image histogram for each of the plurality of angles and a corresponding ground truth histogram for each of the plurality of angles to provide a normalized processed image histogram and a normalized ground truth histogram for each of the plurality of angles, wherein the ground truth histogram corresponds to a ground truth boundary of the object for a corresponding angle; and
   plotting an indication of edges of the normalized processed image histogram for each of the plurality of angles to form a boundary detection evaluation visualization.

2. The method of claim 1, wherein the detected boundary of the image of the object in each processed image is determined by one of use of a boundary detection algorithm in an image processing system or manual annotation.

3. The method of claim 1, wherein the Radon transform is applied to each processed image for a plurality of angles from 0 degrees to 180 degrees.

4. The method of claim 1, wherein the Radon transform is applied to each processed image for a plurality of angles in increments of less than or equal to 5 degrees.

5. The method of claim 1, wherein the processed image is two-dimensional and the Radon transform is applied to the processed image for a plurality of angles in two dimensions.

6. The method of claim 1, wherein the processed image is three-dimensional and the Radon transform is applied to the processed image for a plurality of angles in three dimensions.

7. The method of claim 1, further comprising repeating the steps of receiving the processed image, applying the Radon transform, normalizing, and plotting for a plurality of different processed images that have been processed using a same boundary detection algorithm.

8. The method of claim 1, further comprising repeating the steps of receiving the processed image, applying the Radon transform, normalizing, and plotting for a same image processed using a plurality of different boundary detection algorithms.

9. An apparatus, comprising:
   a receiver configured to receive a processed image, wherein a detected boundary of an image of an object is identified in the processed image;
   a Radon transformer configured to apply a Radon transform to the processed image for a plurality of angles to form a processed image histogram corresponding to the detected boundary for each of the plurality of angles;
   a normalizer configured to normalize the processed image histogram for each of the plurality of angles and a corresponding ground truth histogram for each of the plurality of angles to provide a normalized processed image histogram and a normalized ground truth histogram for each of the plurality of angles, wherein the ground truth histogram corresponds to a ground truth boundary of the object for a corresponding angle; and
   a visualization generator configured to plot an indication of edges of the normalized processed image histogram for each of the plurality of angles to form a boundary detection evaluation visualization.

10. The apparatus of claim 9, wherein the detected boundary of the image of the object in each processed image is determined by one of use of a boundary detection algorithm in an image processing system or manual annotation.

11. The apparatus of claim 9, wherein the Radon transformer is configured to apply the Radon transform to each processed image for a plurality of angles from 0 degrees to 180 degrees.

12. The apparatus of claim 9, wherein the Radon transformer is configured to apply the Radon transform to each processed image for a plurality of angles in increments of less than or equal to 5 degrees.

13. The apparatus of claim 9, wherein the processed image is two-dimensional and the Radon transformer is configured to apply the Radon transform to the processed image for a plurality of angles in two dimensions.

14. The apparatus of claim 9, wherein the processed image is three-dimensional and the Radon transformer is configured to apply the radon transform to the processed image for a plurality of angles in three dimensions.

15. A computer program product for evaluating boundary detection in an image, the computer program product comprising:
   a non-transitory computer readable storage media;
   program code, stored on the computer readable storage media, for receiving a processed image, wherein a detected boundary of an object image of an object is identified in the processed image;
   program code, stored on the computer readable storage media, for applying a Radon transform to the processed image for a plurality of angles to form a processed image histogram corresponding to the detected boundary for each of the plurality of angles;
   program code, stored on the computer readable storage media, for normalizing the processed image histogram for each of the plurality of angles and a corresponding ground truth histogram for each of the plurality of angles to provide a normalized processed image histogram and a normalized ground truth histogram for each of the plurality of angles, wherein the ground truth histogram corresponds to a ground truth boundary of the object for a corresponding angle; and
   program code, stored on the computer readable storage media, for plotting an indication of edges of the normalized processed image histogram for each of the plurality of angles to form a boundary detection evaluation visualization.

16. The computer program product of claim 15, wherein the detected boundary of the image of the object in each processed image is determined by one of use of a boundary detection algorithm in an image processing system or manual annotation.

17. The computer program product of claim 15, wherein the Radon transform is applied to each processed image for a plurality of angles from 0 degrees to 180 degrees.

18. The computer program product of claim 15, wherein the Radon transform is applied to each processed image for a plurality of angles in increments of less than or equal to 5 degrees.

19. The computer program product of claim 15, wherein the processed image is two-dimensional and the Radon transform is applied to the processed image for a plurality of angles in two dimensions.

20. The computer program product of claim 15, wherein the processed image is three-dimensional and the Radon transform is applied to the processed image for a plurality of angles in three dimensions.

21. The computer program product of claim 15, further comprising program code, stored on the computer readable storage media, for repeating the steps of receiving the processed image, applying the Radon transform, normalizing, and plotting for a plurality of different processed images that have been processed using a same boundary detection algorithm.

22. The computer program product of claim 15, further comprising program code, stored on the computer readable storage media, for repeating the steps of receiving the processed image, applying the Radon transform, normalizing, and plotting for a same image processed using a plurality of different boundary detection algorithms.

* * * * *